United States Patent [19]

Tanifuji et al.

[11] Patent Number: 4,740,886
[45] Date of Patent: Apr. 26, 1988

[54] COMPUTER CONTROL SYSTEM UTILIZING KNOWLEDGE PROCESSING

[75] Inventors: Shinya Tanifuji; Yasuo Morooka, both of Hitachi, Japan

[73] Assignee: Hitachi, Ltd, Tokyo, Japan

[21] Appl. No.: 793,773

[22] Filed: Nov. 1, 1985

[30] Foreign Application Priority Data

Nov. 2, 1984 [JP] Japan ................. 59-230185

[51] Int. Cl.⁴ .............................................. G05B 13/04
[52] U.S. Cl. ..................... 364/150; 364/148; 364/164; 364/513
[58] Field of Search ................ 364/148–151, 364/164, 165, 513, 477

[56] References Cited

U.S. PATENT DOCUMENTS

| | | | |
|---|---|---|---|
| 4,419,731 | 12/1983 | Puffet | 364/428 |
| 4,459,259 | 7/1984 | Colley | 364/513 |
| 4,472,770 | 9/1984 | Li | 364/148 |
| 4,542,452 | 9/1985 | Fukai et al. | 364/162 |
| 4,578,747 | 3/1986 | Hideg et al. | 364/151 |
| 4,616,328 | 10/1986 | Kassay et al. | 364/148 |
| 4,628,434 | 12/1986 | Tashiro et al. | 364/148 |

Primary Examiner—Jerry Smith
Assistant Examiner—John R. Lastova
Attorney, Agent, or Firm—Antonelli, Terry & Wands

[57] ABSTRACT

A computer control system utilizing mathematical formula processing and more broadly knowledge engineering is characterized by a man-machine processing unit for defining a mathematical formula model, a program generation unit for converting the defined mathematical formula model to an intermediate code program, a storage device for storing usage conditions (rules) of the defined mathematical formula models and a unit for selecting a mathematical formula model which meets the stored usage condition based on data from a control unit of a plant under control, selecting a program corresponding to the selected mathematical formula model from the programs generated by the program generation unit, and supplying an operation result by the selected program to the control unit.

3 Claims, 8 Drawing Sheets

FIG. 4A
FILE F5

RULE 1. IF (Type = low Carbon)

THEN (a Condition = avEq)

RULE 2. IF (Type = low Carbon) & (heat Time > 1.0)

THEN (a Condion = diff Eq)

RULE 5. IF (Type = low Carbon)

THEN (cost Function = fuel Mini Eq)

RULE 11. IF (Type = high Carbon)

THEN (cost Function = scale Mini Eq)

FIG. 4B
FILE F6 avEq : 1120 =< theta Out =< 1150 diff Eq : 0 =< theta Diff =< 50 fuel Mini Eq : $J = \Sigma(1,1,n)(V(I) * DT(I))$

FIG. 4C
FILE F5 theta Out : theta Out = (TH(1)+2*TH(2)+2*TH(3)+2*TH(4)+TH(5))/8

| OPERATION CODE | OPERATION | OPERATION CODE | OPERATION |
|---|---|---|---|
| + | ADD | <= | SUBSTITUTE |
| − | SUBTRAG | < | COMPARE |
| * | MULTIPLY | > | |
| / | DIVIDE | =< | |
| Σ(m₁,m₂,m₃) | ACCUMULATE | >= | |
| = | EQUAL | ⋮ | ⋮ |

FIG. 7A ( (1120) (=<) (* theta Out) (=<) (1150) )

FIG. 7B

```
( *theta Out <= ( ( ( ( ( TH(1) + (2 * TH(2))
                      )
                       + (2*TH(3))
                    )
                     + (2*TH(4))
                  )
                   + TH(5)
                )
                 / 8
              )
```

| - | % WT(11) | WT(10) | WK 1 |
| / | WK 1 | DT | % WT(18) |

FIG. 7F

| - | 1120 | WT(10) | BL(2) |
| - | 1150 | WT(10) | BU(2) |
| <= | WT(18) | H(2,1) | |
| <= | WT(19) | H(2,2) | |
| ⋮ | | | |
| <= | WT(18+n-1) | H(2,n) | |

| $a_1$ |
| $a_2$ |
| $a_3$ |

FIG. 11B

Rule 1: IF($a_1$) THEN(a Condition = EQ 2)
Rule 2: IF($a_6$) THEN(a Condition = EQ 1)
Rule 3: IF($a_1$ and $a_3$) THEN($b_2$ is 10)
Rule 4: IF($a_1$ and $a_4$) THEN($b_2$ is 20)

EQ1: $X_1 \leq 1000$
EQ2: $X_2 \leq b_2$ $X_1 = (x_1 + x_2)/2$ $X_2 = 5 * (x_3 + x_4)$

COMPUTER CONTROL SYSTEM UTILIZING KNOWLEDGE PROCESSING

BACKGROUND OF THE INVENTION

The present invention relates to computer control which utilizes a knowledge information processing technique in order to determine an optimal control strategy, and more particularly to a computer control system which determines an optimal one of a set of mathematical models, which represents a control strategy, and applies the model in performing the real control by using the knowledge information processing technique.

In a computer control system or more broadly an information processing system, the control method or strategy of the system is represented by a mathematical model, and the model is translated to a programming code in order to apply the mathematical model to the real system. For instance, control objects of the process control system are described by the mathematical model, and they are used to realize an optimal control under various operations of the plant.

However, the given mathematical model is not always optimal under all operations.

Where the plant is complex or a characteristic of the plant is not clear and cannot be fully grasped, it is not uncommon that a control method is determined by an operational experience (know-how) of an operator. Usually, the more experience the operator has, the better will be the control method selected. Further, when an operation sequence is changed or an operation which has not been included in an initial plan is added to the system, the mathematical model and many parts of a developed program must be modified or another new program must be developed again. Various errors may be introduced during this process, and this may cause the following problems.

(i) System trouble due to bugs included in the corrected or added program.

(ii) Big effect to correct or add the program.

It is difficult to perfectly avoid errors when correction of the program is carried out manually. Typical example thereof is a combustion control of a reheating furnace in a rolling plant. The reheating furnace heats various types and sizes of materials. A real-time digital control system (IFAC, Jan. 17-20, 1983, IFAC/IFIP Symposium) has been developed for the control of the heating furnace. In such a control system, the program must be corrected or added to when the control object changes. Thus, bugs are introduced and a big effort is needed for debugging. When a new mathematical model (or formulas) is given, we must derive a relationship between the mathematical formulas, determine an algorithm for searching for a solution which satisfies the mathematical formulas and convert the relationship and the algorithm to a program. Accordingly, when a new mathematical formula is added or any formula in the system must be modified, many parts of the program must be amended.

Though the correction and development of the program are usually done by system engineers or programmers, it is difficult to perfectly prevent errors in each step of converting the mathematical formulas to the program.

We encounter a similar problem in the control system of a turbine or boiler of a thermoelectric power plant, and in a system which is based on a modern control theory, in which control strategies are represented by cost functions and restriction functions.

SUMMARY OF THE INVENTION

It is an object of the present invention to provide a system which can accommodate the new model without modifying the program directly.

In accordance with the present invention, the mathematical formula and the mathematical formula usage conditions are defined by a user and the formula is translated to a kind of program automatically, and the translated program is linked to another program developed prior to the definition when the usage condition is satisfied.

The "usage conditions" represent under what condition the mathematical formula or its translated program should be used. In other words, usage conditions select optional sets of mathematical formula from the many formulas defined by the user. This selection is realized by the knowledge processing technique, or "influence".

DESCRIPTION OF THE PREFERRED EMBODIMENT

The present invention will now be described in connection with temperature control of a heating furnace in a rolling plant.

Figure 1:
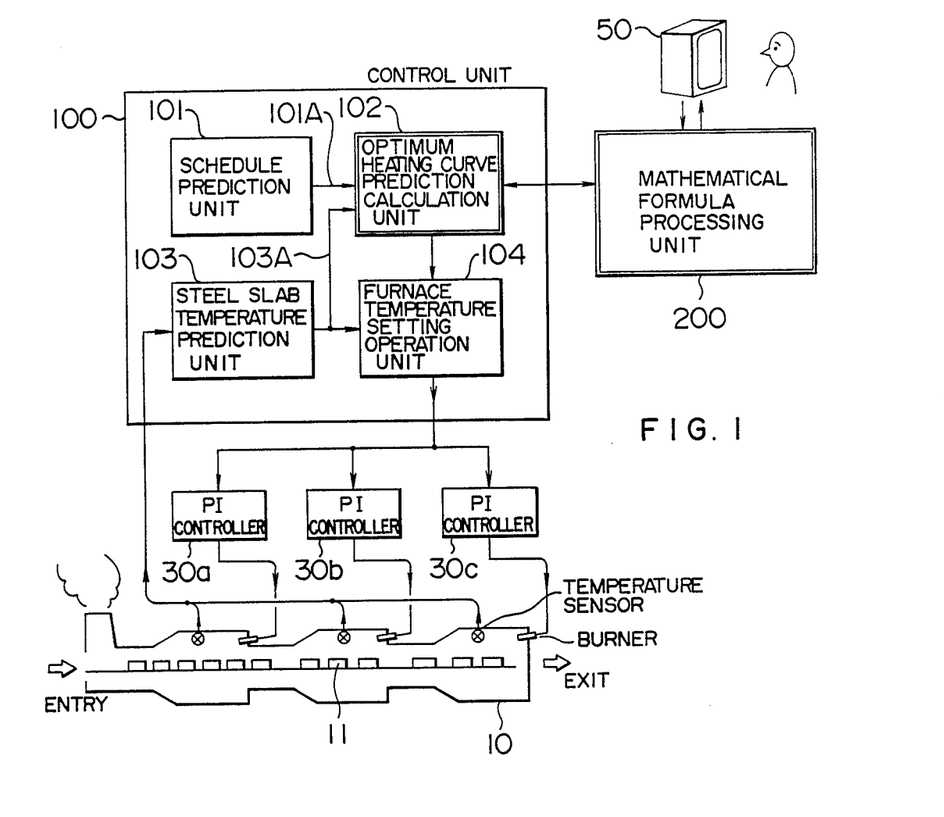
FIG. 1 shows a block diagram of the present invention.

In FIG. 1, numeral 100 denotes a control unit, numeral 200 denotes a mathematical formula processing unit, numeral 101 denotes a movement schedule prediction unit, numeral 103 denotes a steel slab temperature prediction unit, numeral 102 denotes a prediction calculation unit and numeral 104 denotes a control amount prediction unit. Numerals $30a \sim 30c$ denote proportional integration controllers (PI controllers), and numeral 11 denotes a steel slab to be heated by the heating furnace 10. Fuel is supplied from a burner and a furnace temperature is detected by a furnace temperature sensor to control the furnace temperature. While the steel slab is transported from an entrance to an exit of the furnace, it is heated to an object extraction temperature.

The prediction operation unit 102 which directly relates to the control object is coupled to the mathematical formula processing unit 200 to determine an optimum steel slab heating curve. In FIG. 1, the present invention is applied to the prediction operation unit 102 and the mathematical formula processing unit 200. The prediction calculation unit 102 inquires to the mathematical formula processing unit 200 what control object is to be set from furnace operation data. The mathematical formula processing unit 200 compares the mathematical formula usage conditions with the funace operation data to select a mathematical formula. The mathematical formula processing unit 200 automatically converts the selected mathematical formula to an executable program and returns it to the prediction calculation unit 102. The prediction calculation unit 102 receives the program, executes it and determines the heating curve based on the execution result.

Figure 2:
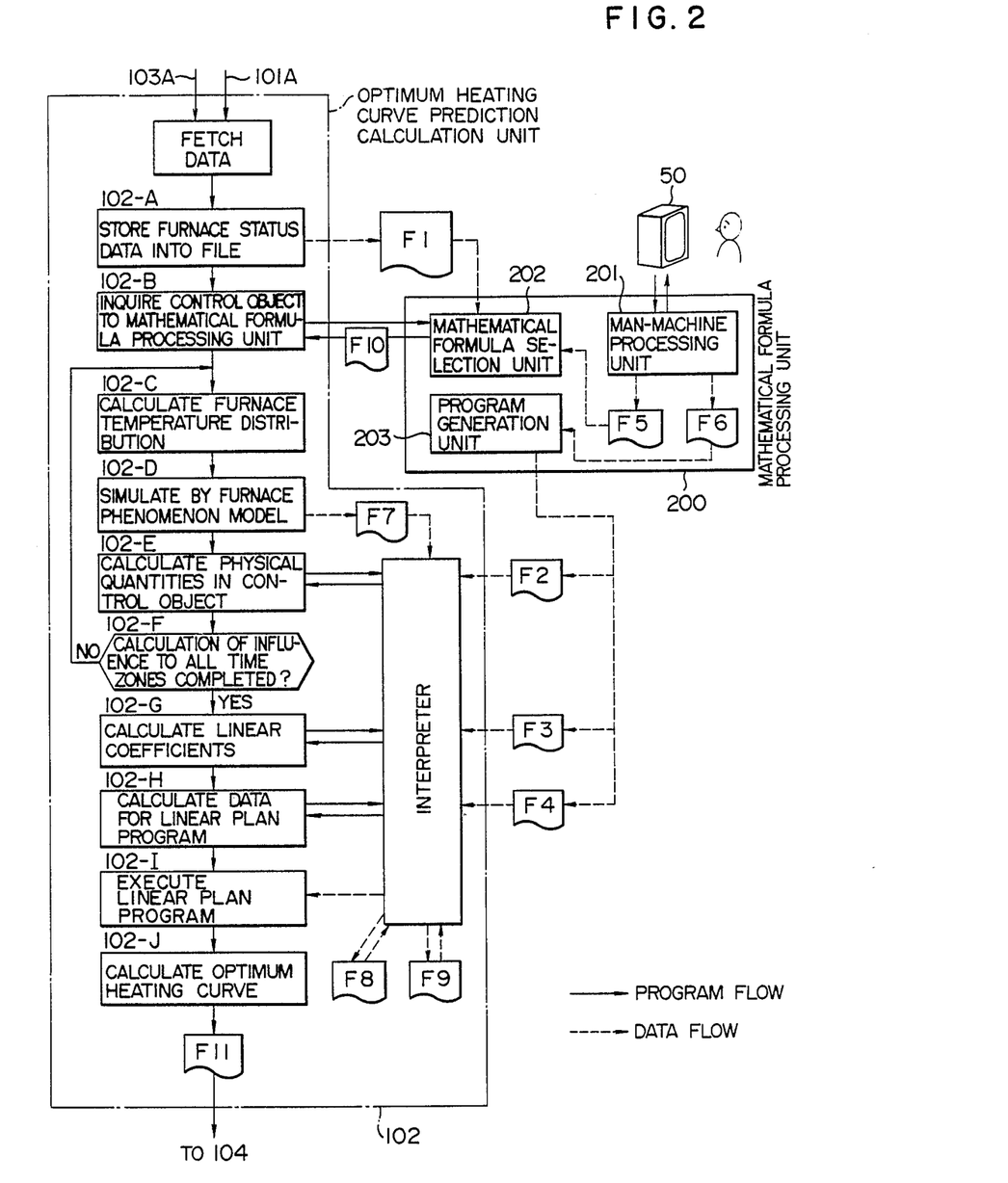
FIG. 2 shows a process flow of the present invention.

Referring to FIG. 2, details of the prediction calculation unit 102 and the mathematical formula processing unit 200 will be explained. Solid lines show a program execution flow and broken lines show a data flow. In FIG. 2, numerals 102-A to 102-J denote process steps. Numeral 300 denotes an interpreter, numeral 201 denotes a man-machine processing unit to which a user interactively inputs the mathematical formulas, numeral 202 denotes a mathematical formula selection unit, and numeral 203 denotes a program generation unit which automatically converts the selected mathematical formula to an executable program.

F1~F11 denote data files. F1 is an interface file from which status data in the furnace (type of steel, plate thickness, resident time in the furnace and etc.) necessary for selecting the mathematical formula are delivered to the mathematical formula processing unit, F2~F4 are files which store the executable programs to be delivered from the mathematical formula processing unit 200 to the prediction calculation unit 102, F5 and F6 are files which store the mathematical formulas and the mathematical formula usage conditions supplied through the man-machine processing unit 201, F7~F9 are work files used by the prediction calculation unit, F10 is an interface file for the selected mathematical formula, and F11 is an interface file for an output data.

In a step 102-A of the prediction calculation unit 102, data 101A and 103A supplied from the schedule prediction unit 101 and the steel slab temperature prediction unit 103, that is, the data representing the status in the furnace such as a type of steel of the steel slab (called object material) which is the object of the heating curve, a plate thickness, an extraction time (resident time in the furnace) and a furnace temperature distribution, are stored in the file F1. In a step 102-B, the mathematical formula processing unit 200 is started. The mathematical formula processing unit 200 selects mathematical formulas (cost function or restriction function) based on the furnace status data (202), converts the mathematical formulas to calculatable programs, (called intermediate codes) (203), and stores them in the interface files F2, F3 and F4.

In steps 102-C to 102-H of the prediction calculation unit 102, data to be used in a linear plan program is generated in accordance with the mathematical formulas represented by (1)~(5) below. In a step 102-I, the linear program is executed, and in a step 102-J, an optimum furnace temperature distribution {T(1), T(2), ... , T(n)}$_{OPT}$ from which a calculation result by the linear plan method is obtained is determined and a steel slab heating curve for heating the steel slab under that furnace temperature distribution is calculated. The steps 102-E, 102-G and 102-H directly relate to the mathematical formula representing the control target, and the programs to be executed are stored as the intermediate codes in the interface files F2, F3 and F4 supplied from the mathematical formula processing unit 200. (Detail will be described later.)

Cost function (J→minimum)

$$J = \sum_{i=1}^{n} v(i)\Delta \tau_i \quad (1)$$

Restriction functions ((2)-(5))

$$\bar{\theta}^L \leq \bar{\theta}_{OUT} \leq \bar{\theta}^U \quad (2)$$

$$\Delta\theta^L \leq \Delta\theta_{OUT} \leq \Delta\theta^U \quad (3)$$

$$0 \leq v(i) \leq v^U(i) \quad (4)$$

$$T^L(i) \leq T(i) \leq T^U(i) \quad (5)$$

$(i=1\sim n)$ where n represents number of divisions for a prediction period from the present time to the extraction time (which is calculated by the movement schedule prediction unit 21), i represents a time zone number and $\Delta\tau_i$ represents a period of the i-th time zone. Thus, T(i) and v(i) represent a furnace temperature and a fuel flow rate required to heat the steel slab under consideration, in the i-th time zone. $\bar{\theta}_{OUT}$ and $\Delta\theta_{OUT}$ represent a mean value of extraction steel slab temperatures and an incandesence (difference between temperatures at the surface and at the inside of the steel slab), respectively. The term with suffix L or U represents a lower limit or upper limit of the formula, respectively. The formula (1) is a cost function for minimizing the amount of fuel required from the present time to the extraction time, the formulas (2) and (3) are restriction functions for the steel slab extraction temperature, and the formulas (4) and (5) are restriction formulas for the fuel flow rate and the furnace temperature determined by a facility capacity.

It is an object of the combustion control system is to obtain a solution which simultaneously meets the aforementioned mathematical formulas (1)~(5). In the steps 102-E, 102-G and 102-H, the interpreter 300 is merely started to execute the intermediate code and the processing of the mathematical formula for the particular control object is not carried out in those steps. Accordingly, the steps 102-A to 102-J may be standard programs which do not depend on the control object.

Let us assume that the formulas (1), (2), (4) and (5) have been selected by the mathematical formula processing unit 200 as the control object. In order to avoid unnecessary complexity of the description, it is assumed that the upper and lower limits of the formulas (2), (4) and (5) are constant and the number of divisions n and the time period $\Delta\tau_i$ are predetermined.

The content of the processing by the prediction calculation unit 102 will be explained in more detail. The prediction calculation unit 102-C determines an appropriate furnace temperature distribution {T(1), T(2), ... , T(n)} and determines, in the step 102-D the temperature distribution in the steel slab and the fuel flow rate by simulation by using a furnace phenomenon model, which may be a thermal conduction equation or a fuel flow rate formula. The quantities calculated by the furnace phenomenon model are basic physical quantities to estimate the status in the furnace and they have no direct connection with the particular control object.

The step 102-D represents the program itself for calculating the furnace phenomenon.

Figure 3:
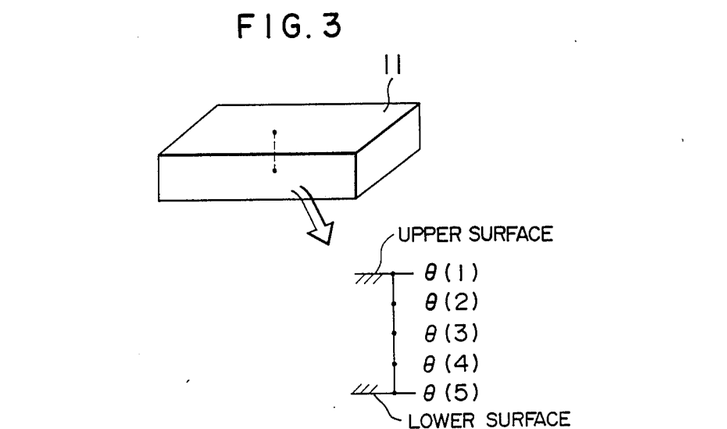
FIG. 3 illustrates temperature at various points in a steel slab.

The calculated temperature distribution of the steel slab is represented by $\theta(1), \ldots, \theta(5)$ in FIG. 3 and the calculated fuel flow rates in the respective time zones are represented by $v(1), v(2), \ldots v(n)$. The calculation results are stored in a predetermined location of the process data storage table F7.

The control object may include a physical quantity which is not directly calculated in the furnace phenomenon model (for example, $\bar{\theta}_{OUT}$ in the formula (2)). In order to determine it, it is necessary to connect the physical quantity with the basic physical quantity calculated by the furnace phenomenon model. For $\bar{\theta}_{OUT}$, the following rotational formula is defined together with the definition of the formula (2). (This will be explained in connection with the man-machine processing unit 201).

$$\bar{\theta}_{OUT} = \tfrac{1}{6}\{\theta(1)+2\theta(2)+2\theta(3)+2\theta(4)+\theta(5)\} \quad (6)$$

A program for the above relational formula is automatically generated by the mathematical formula processing unit 200 and stored in the interface file F2. On the other hand, the data used to execute the program is stored in the process data storage table F7 as was explained in the step 102-D. In the step 102-E, as the interpreter 300 is started, the interpreter fetches the intermediate codes from the file F2 and executes them. As a result, $\bar{\theta}_{OUT}$ is determined and stored in a predetermined location in the work table F8.

The calculations in the steps 102-C to 102-E are repeatedly carried out for several different furnace temperature distribution. The calculations of the steps 102-C to 102-E are carried out on the furnace temperature distribution $\{T_o(1), \ldots, T_o(n)\}$ at the linear center and are first carried out to determine $\bar{\theta}_{OUT}$ and $v(i)$. (They are represented by $\bar{\theta}_{OUT,o}$ and $v_o(i)$). Then, the furnace temperature in the j-th time zone is set to $T_o(j)+\Delta T$ ($\Delta T$ is a constant) and similar calculations are repeated ($j=1 \sim n$). The results are represented by $\bar{\theta}_{OUT,j}$ and $v_j(i)$. The results are stored in the work table F8.

From these results, the degree of influence of the change of the furnace temperature in each time zone to the physical quantity is calculated by the following formulas.

$$\alpha_j = \frac{\bar{\theta}_{OUT,j} - \bar{\theta}_{OUT,o}}{\Delta T} \quad (j = 1 \sim n) \quad (7)$$

$$\gamma_{i,j} = \frac{v_j(i) - v_o(i)}{\Delta T} \begin{pmatrix} i = 1 \sim n \\ j = 1 \sim n \end{pmatrix} \quad (8)$$

The mathematical formula processing unit 200 automatically generates programs (corresponding to the formulas (7) and (8)) for calculating the linear coefficients on the physical quantities such as steel slab extraction temperature $\bar{\theta}_{OUT}$ and fuel flow rate $v(i)$ from the formulas (1)~(5), and stores them in the interface file F3. As the interpreter 300 is started in the step 102-G of FIG. 2, the interpreter 300 executes those programs to determine the linear coefficient $\alpha_i$ and $\gamma_{i,j}$.

The physical quantities $\bar{\theta}_{OUT}$ and $v(i)$ appearing in the control object are represented as follows.

$$\bar{\theta}_{OUT} = \bar{\theta}_{OUT,o} + \sum_{i=1}^{n} \alpha_i x_i \quad (9)$$

$$v(i) = v_o(i) + \sum_{i=1}^{n} \gamma_{ij} X_i \quad (10)$$

$$(i = 1 \sim n)$$

where $X_i$ represents a small change of the furnace temperature in the i-th time zone. In the present embodiment, $X_i$ is handled as an independent variable. By putting the formulas (9) and (10) in the formulas (1), (2), (4) and (5), we get $$J = [C_o + C_x]\text{minimum} \quad (11)$$

$$b^L \leq H \cdot x \leq b^U \quad (12)$$

where $$C_o = \sum_{i=1}^{n} v_o(i) \Delta \tau_i \quad (13)$$

$$C = \begin{pmatrix} \sum_{i=1}^{n} \gamma_{ij} \Delta \tau_i \\ \cdot \\ \cdot \\ \cdot \\ \sum_{j=1}^{n} \gamma_{nj} \Delta \tau_n \end{pmatrix} \quad (14)$$

$$b^L = \begin{bmatrix} \theta^L - \theta_{OUT,o} \\ -v_o(1) \\ \cdot \\ \cdot \\ \cdot \\ -v_o(n) \\ T^L(1) - T_o(1) \\ \cdot \\ \cdot \\ \cdot \\ T^L(n) - T_o(n) \end{bmatrix}, \quad b^U = \begin{bmatrix} \theta^U - \theta_{OUT,o} \\ v^U(1) - v_o(1) \\ \cdot \\ \cdot \\ \cdot \\ v^U(n) - v_o(n) \\ T^U(1) - T_o(1) \\ \cdot \\ \cdot \\ \cdot \\ T^U(n) - T_o(n) \end{bmatrix} \quad (15)$$

$$H = \begin{bmatrix} \alpha_1 & \alpha_2 & \ldots & \alpha_n \\ \gamma_{11} & \gamma_{12} & \ldots & \gamma_{1n} \\ \cdot & \cdot & & \\ \cdot & \cdot & & \\ \cdot & \cdot & & \\ \gamma_{n1} & \gamma_{n2} & \ldots & \gamma_{nn} \\ 1 & 0 & \ldots & 0 \\ \cdot & \cdot & & \\ \cdot & \cdot & & \\ \cdot & \cdot & & \\ 0 & 0 & \ldots & 1 \end{bmatrix} \quad (16)$$

$$x = \begin{pmatrix} x_1 \\ x_2 \\ \cdot \\ \cdot \\ \cdot \\ x_n \end{pmatrix} \quad (17)$$

If the elements of the formulas (13) to (16) are given, a solution which meets the formulas (11) and (12) can be obtained by the standard program of the linear plan method. The formulas (13)~(16) are given with the calculation formulas for the respective elements but those calculation formulas vary depending on which mathematical formula is selected as the control object. After the mathematical formula has been selected, the mathematical formula processing unit 200 generates a program for calculating $C_o$, C, $b^L$, $b^U$ and H from the mathematical formula, and stores it in the file F4. In the step 102-H of FIG. 2, as the interpreter is started to execute the program in the file F4, data necessary in the linear plan program is generated (as will be explained in detail in the mathematical formula processing 200).

After the above calculation, the linear plan method calculation program is started in the step 102-I to determine an optimum value $\{X_{1,OPT}, X_{2,OPT}, \ldots X_{n,OPT}\}$ of the small change of the furnace temperature which minimizes the cost function (11). The optimum furnace temperature distribution $\{T(1), T(2), \ldots, T(n)\}_{OPT}$ is given by $\{T_o(1)+X_{1,OPT}, T_o(2)+X_{2,OPT}, \ldots T_o(n)+X_{n,OPT}\}$. In the step 102-J of FIG. 2, a change of the steel slab temperature when it is heated by the optimum furnace temperature is determined from the thermal conduction equation and it is set as an optimum steel slab heating curve.

Figures 4A, 4B:
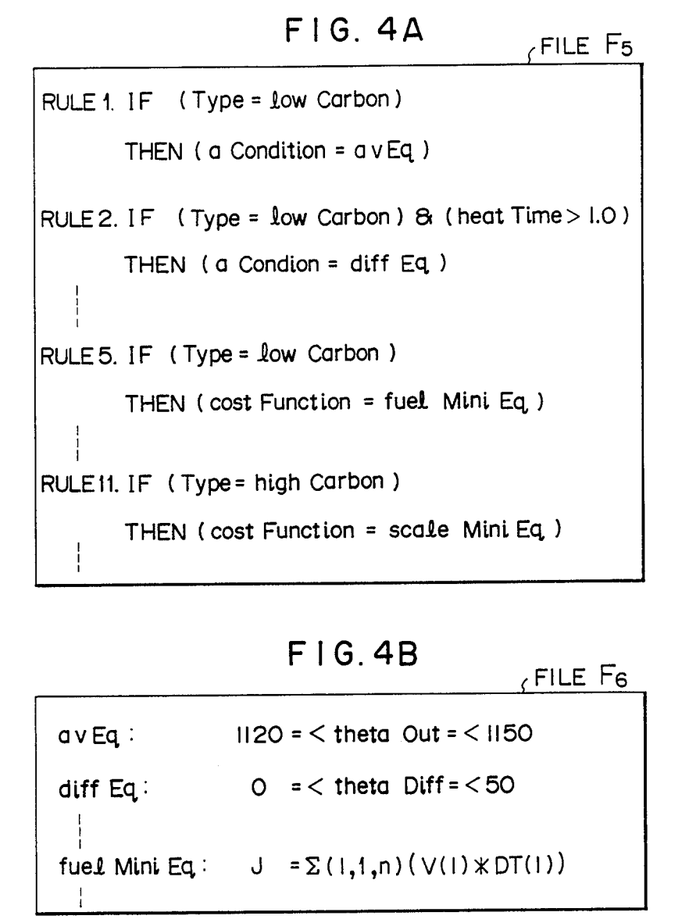
FIGS. 4A to 4C show examples of mathematical formula model usage conditions and mathematical formula models.
Figure 4C:
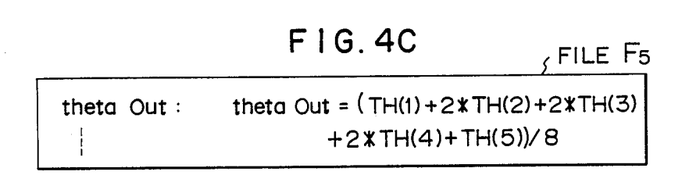

The function and configuration of the mathematical formula processing unit 200 will now be explained. The man-machine processing unit 201 of FIG. 2 supports the inputting of the mathematical formula usage conditions and the mathematical formulas by the user and stores the input data in the files F5 and F6. FIG. 4A shows the mathematical formula usage conditions in the file F5, FIG. 4B shows definitions of the mathematical formulas in the file F6, and FIG. 4C shows the formula which connects the physical quantity appearing in the mathematical formula with the basic physical quantity calculated by the furnace phenomenon model and which is stored in the file F5. As shown in FIG. 4A, the mathematical formula usage condition is inputted in the form of "IF~THEN . . . ", where "~" represents a condition which should be met to use a certain mathematical formula (called presumption), and type and name of the mathematical formula used when the condition is met are shown in ". . . " (called conclusion). For example, the rule 1 represents that "IF the type of the steel slab is a low carbon steel, THEN use an extraction temperature mean value condition avEq as a condition". The first formula in FIG. 4B is a definition formula for avEq and a definition formula for theta Out appearing in the first formula is shown in FIG. 4C. Those mathematical formula usage conditions, mathematical formulas and definition formulas for the physical quantities are stored in the files F5 and F6 as character sequences. Accordingly, the addition or correction of the mathematical formula means the edition of the character sequence files. The man-machine processing unit 201 supports the interactive edition of the character sequence files.

When the content of the interface file F1 is supplied to the mathematical formula selection unit 202 of FIG. 2 from the prediction calculation unit, the mathematical formula selection unit 202 compares the data in that file (type of steel, plate thickness, furnace resident time, etc.) with the mathematical usage conditions in the file F5 to determine the mathematical formula to be used. For example, if the low carbon steel data is in the interface file F1 as the type data, it is determined that the formula avEq is to be used by the rule 1 in the file F5 (FIG. 4A). Similarly, all data in the interface file F1 is handled by all rules in the file F5 (FIG. 4A) to select and store in the file F10 all mathematical formulas necessary for the calculation of the heating curve.

The mathematical formula selection unit 202 carries out predetermined processing independently from the content of the mathematical formula usage conditions in the file F1. Namely, it (1) fetches one of the conditions in the file F5, (2) checks if there is a corresponding one to the presumption of the fetched condition, in the data in the file F1, (3) if there is, stores the corresponding conclusion in the file F10, and (4) if there is no corresponding one, the steps (1)~(3) are carried out for another condition. The processing is continued until all usage conditions are checked. The mathematical formula selection unit controls the process flow for the determination (estimation) of whether the condition is met or not. All contents of the usage conditions are in the file F5 and they are merely the data to be processed when viewed from the mathematical formula selection unit. Accordingly, even if the mathematical formula usage condition or related mathematical formula is changed, it is not necessary to change the processing procedure (program) of the mathematical selection unit 202.

Figure 5:
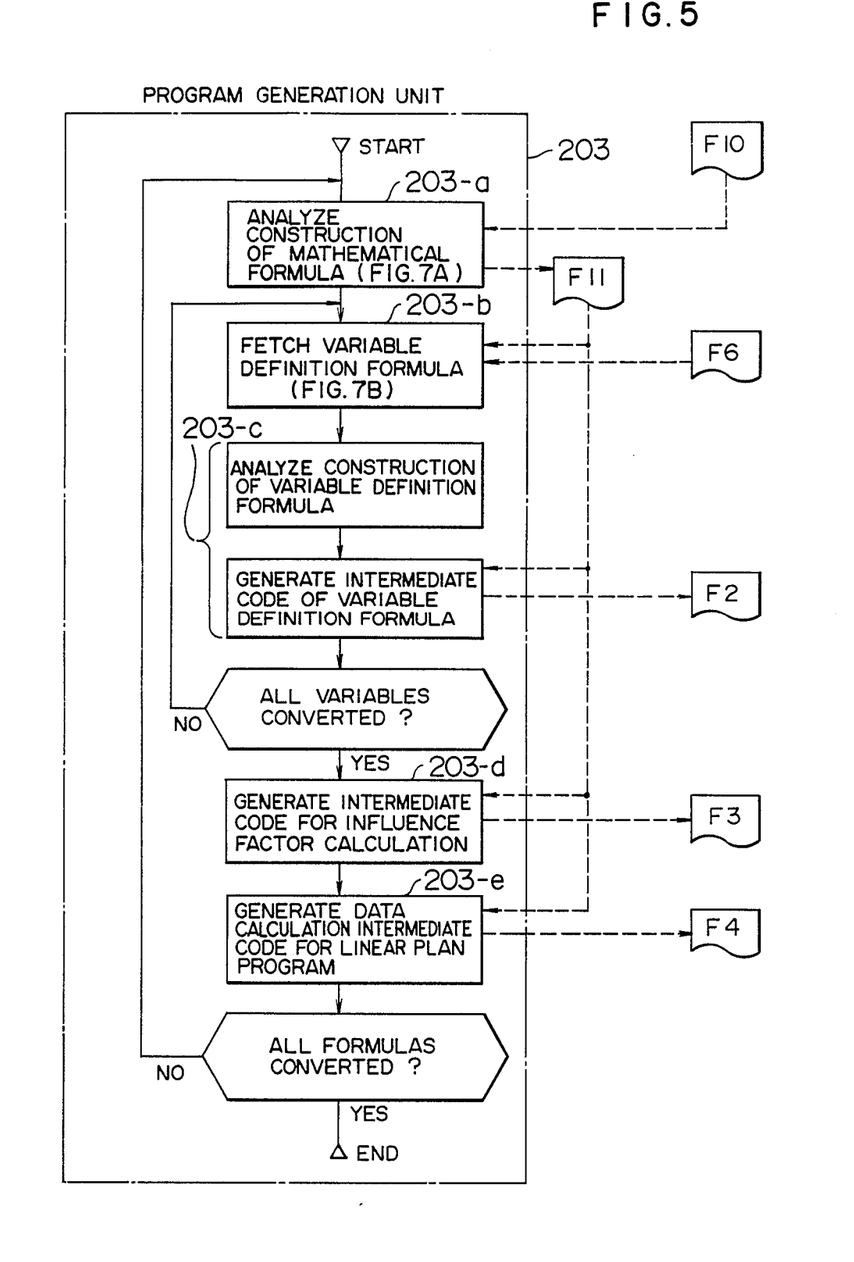
FIG. 5 shows a process flow of an intermediate code program generation unit.
Figure 6:
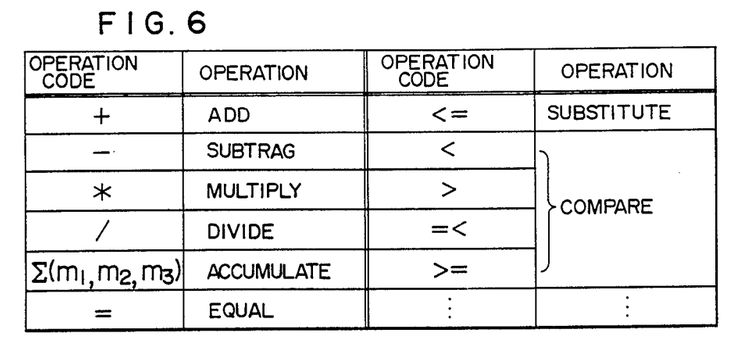
FIG. 6 shows examples of operation codes.

Referring to FIG. 5, the processing of the intermediate code generation unit 203 is explained. When the user interactively defines the formula by the man-machine processing unit 201 by using a terminal device 50 or corrects the defined mathematical formula, the intermediate code generation unit 203 converts the mathematical formula to an executable program, which comprises a code representing a type of operation and data (or address at which the data is stored) used in the operation. FIG. 6 shows typical operation codes.

The processing of the intermediate code generation unit will be explained for the following example in accordance with the process flow of FIG. 5.

A mathematical formula defined by the man-machine processing unit:

$$1120 = < \text{theta Out} = < 1150 \quad (18)$$

A definition formula (19) of the physical quantity in the formula (18):

$$\text{theta Out} = (TH(1)+2TH(2)+2TH(3)+2TH(4)+TH(-5))/8 \quad (19)$$

Step 1 (203-a in FIG. 5): The defined mathematical formula is taken out of the file F6, and the mathematical formula is decomposed to elements to check which of operation, variable and constant each element corresponds to. This technique has been known as a construction analysis and the explanation thereof is omitted.

Figures 7A, 7B:
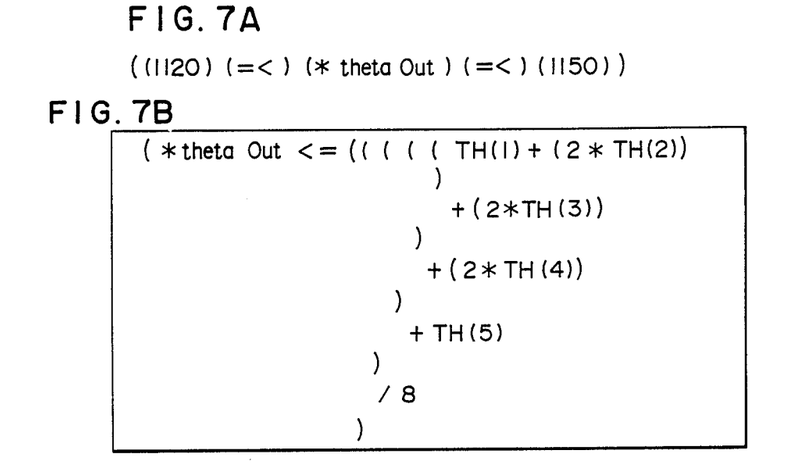
FIGS. 7A to 7F are flow charts for illustrating generation of a program.

FIG. 7A shows a result of processing of the formula (18) in the step 203-a. FIG. 7A represents the elements which constitute the mathametical formula and * indicates that the element is variable. The expression shown in FIG. 7A is sometimes called a list expression.

Step 2 (203-b in FIG. 5): Then, whether a variable (called undefined variable) other than those directly calculated by the furnace phenomenon model is included in the mathematical formula shown in FIG. 7A. If the undefined variable is included, a definition formula therefor is fetched from the file F6. In FIG. 7A, the variable theta Out is included. Thus, the formula (19) is fetched from the file F6.

Figure 7C:
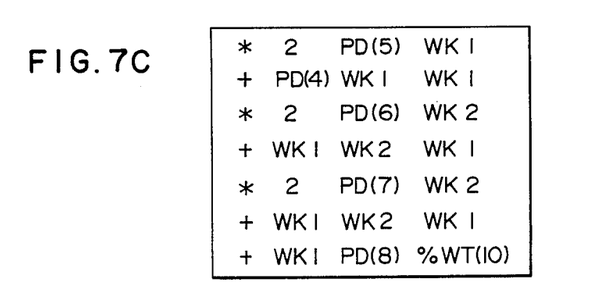
Figure 7D:
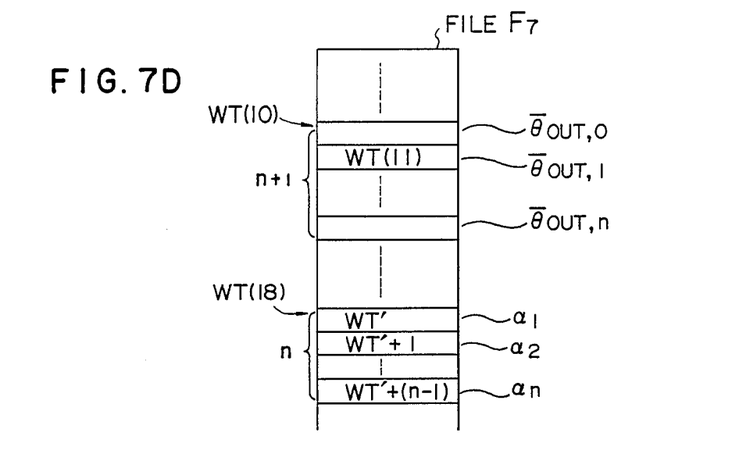
Figure 8:
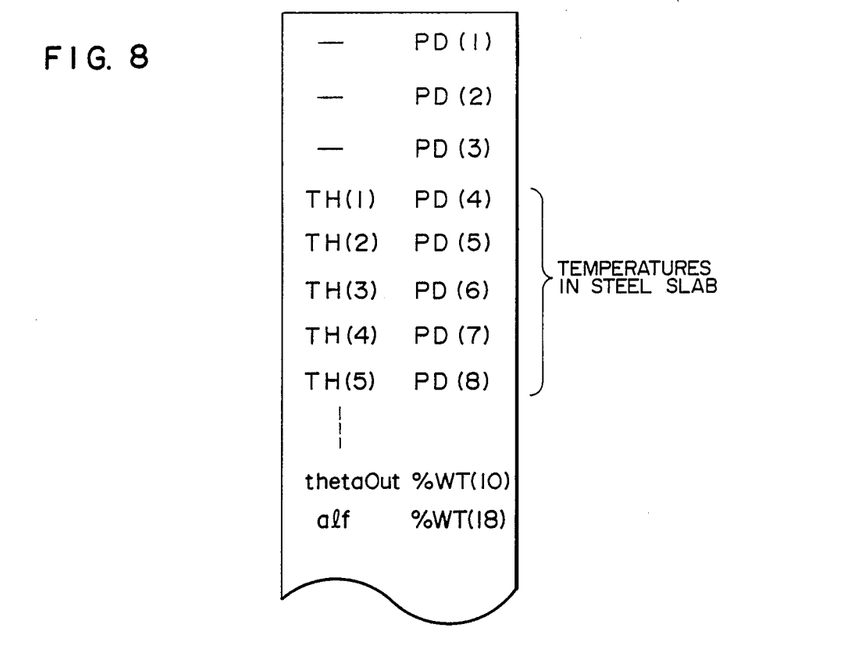
FIG. 8 shows a variable conversion table.

Step 3 (203-c in FIG. 5): The definition formula fetched in the previous step is converted to a list in the operation sequence (FIG. 7B) in the same manner as the step 1. The conversion is programmed such that the calculation is carried out from the larger number to the smaller number in the parentheses. FIG. 7C shows an executable program of the formula (19). The first element in each line of FIG. 7C represents an operation code, the second and third elements represent arguments and the fourth element represents a storage location of the operation result. All elements other than constants represent data and storage locations to be accessed. TH(1), TH(2), . . . TH(5) in FIG. 7B are converted to PD(4), PD(5), . . . , PD(8) at which the calculated temperatures in the steel slab are actually stored, in accordance with a variable conversion table shown in FIG. 8. In FIG. 7C, % WT (10) indicates a storage location at which the calculated theta Out is stored. It is secured in a vacant area in the file F8. As described in the step 102-E of FIG. 2, theta Out is calculated $(n+1)$ times so that $(n+1)$ storage locations are provided. In "%WT(10)", WT(10) shows a start address and % shows that there are a plurality of storage locations. FIG. 7D show arrangement of theta Out or the storage locations of $\bar{\theta}_{OUT}$.

Figure 7E:
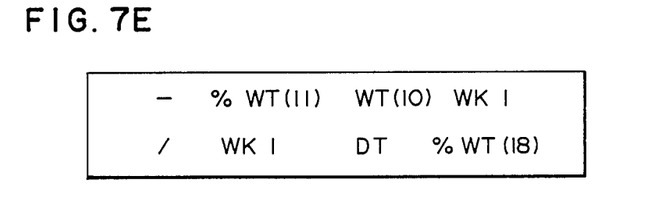

Step 4 (203-d in FIG. 5): A program for calculating the linear coefficient can be readily prepared by using the data on the storage locations of the variables determined in the step 3. For example, a linear coefficient $\alpha_1$ in the first time zone is obtained by subtracting theta Out at the address WT(10) from theta Out stored at the address WT(11) and dividing the difference by $\Delta T$. Accordingly, the program is represented as shown in FIG. 7E. In this program, WT(18) shows a storage location for $\alpha_1$ and the beginning of the vacant area on the file F7.

Step 5 (203-e in FIG. 5): In the step 5, a calculation program for the linear formula of the mathematical formula representing the control object is derived. For the formula (18), a program which executes the following processing is generated.

(1) Lower limit of linear approximation formula [1120-theta Out at linear center] (stored at WT of FIG. 7D)
(2) Upper limit of linear approximation formula [1150-theta Out at linear center]
(3) First linear coefficient=$\alpha_1$ (WT' in FIG. 7E)
   Second linear coefficient=$\alpha_2$(WT'+1 in FIG. 7E)
   n-th linear coefficient=$\alpha_n$ (WT'+(n-1) in FIG. 7E)

Figure 7F:
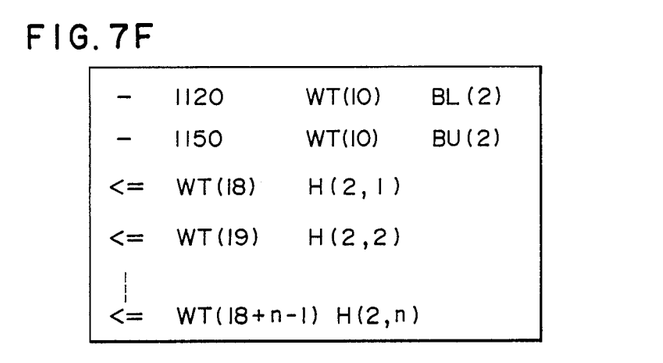

The processing is carried out for all selected mathematical formulas. If the formula (19) is the second mathematical formula to be processed, the program for the above processing is represented by FIG. 7F, in which BL(2), BU(2), HH(2, I) (I=1~n) represent storage locations of the lower limit, upper limit and linear coefficient of the K-th linear formula and they are arguments for the standard program of the linear plan method. Accordingly, as the program of FIG. 7F is executed, the result thereof is delivered to the standard program of the linear plan method.

The programs in FIGS. 7C, 7E and 7F are called intermediate codes which are stored in the files F2, F3 and F4, respectively and delivered to the production calculation unit 102.

Figure 9:
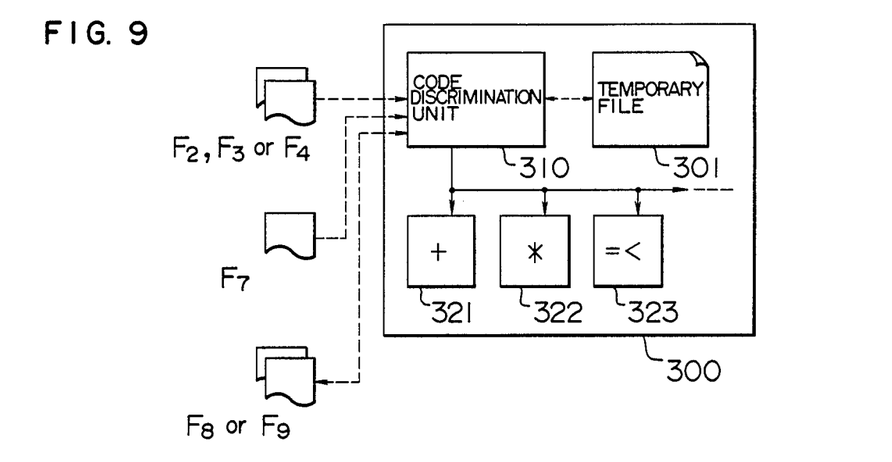
FIG. 9 is a block diagram of an interpreter.

Finally, the function of the interpreter 300 will be explained. When the interpreter 300 receives the stored file of the intermediate codes, it fetches the data starting from the beginning of the file and interpretes it. FIG. 9 shows a block diagram of the interpreter. Numeral 310 denotes a code discrimination unit, numerals 321, 322, 323, . . . denote operation units, and numeral 301 denotes a temporary data file. The code discrimination unit 310 fetches the top data from the intermediate code storage file (F2, F3 or F4) to discriminate the type of operation code. Then, it fetches as many data from the intermediate code storage file as the number of arguments determined by the operative code. As seen from FIG. 7B, the data following the operation code indicates the storage address of the data to be used in the operation or it is a constant. If the data indicates the address, the code discrimination unit fetches the data to be used in the operation from the corresponding address of the file (F7, F8 or F9). One of the operation units corresponding to the operation code is selected by using the data as the argument. The operation units are provided one for each operation code. Those operation units are compiled programs, carry out the operations designated by the arguments and return the operation results. Since the storage location of the operation result is designated by the intermediate code (FIGS. 7C, 7E, 7F), the code discrimination unit 310 can store the result at the designated address.

The interpreter 300 continues the interpretation while it fetches the data from the intermediate code storage file and determines the data which is finally required by the linear plan program.

In the present embodiment, the control object used for the heating furnace combustion control can be added or corrected without manual program correction, and the expansion and modification of the combustion control function can be readily attained.

In the present embodiment, the mathematical formula representing the control object is automatically converted to the program when the control object is inputted by the man-machine processing unit. In this method, the mathematical formula need not be converted each time the mathematical formula is selected and the program can be immediately delivered to the prediction calculation unit. As a result, the processing speed is significantly improved.

In the present embodiment, the mathematical formula is converted to the intermediate code and processed by the interpreter. Alternatively, it may be converted directly to a machine language of the computer which carries out the present system. In this case, the processing speed is also significantly improved although a conversion program must be reconstructed when the program is to be transferred to a different type of machine.

In the embodiment of FIG. 1, the mathematical formula representing the control object is converted to a program by the mathematical formula processing unit. Where all of the mathematical formulas to be used are known and only the usage conditions thereof are subject to possible modification, all mathematical formulas are prepared in the control unit as program modules and an estimation unit which determines which mathematical formula is to be used or determines data to be used in the mathematical formula depending on the condition may be used instead of the mathematical processing unit 200 of FIG. 2. The estimation unit has a file to store the usage conditions of the control object and the usage condition can be added or modified by the interaction with the user. The estimation unit determines which usage condition is met based on the data sent from the control unit, and instead of generating the program corresponding to the satisfied usage condition, it determines which program module in the control unit is to be started and indicates the result to the control unit. In this system, the program of the mathematical formula is not automatically generated but the manner of usage of the control object can be more readily changed than in the prior art system.

The above embodiment was explained in connection with the combustion control of a heating furnace (furnace temperature control). More generally, it may be represented by a block diagram of FIG. 10.

Figure 10:
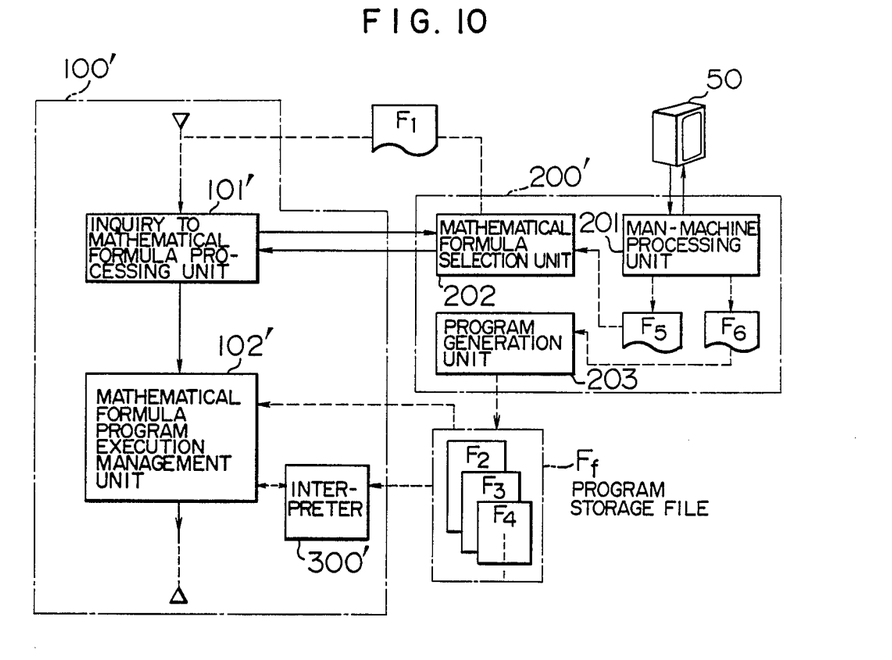
FIG. 10 is a more generalized block diagram of the present invention.

In FIG. 10, a control unit 100' corresponds to the control unit of FIG. 1 and it is called a control information system. Numeral 200' corresponds to the mathematical formula processing unit of FIG. 1 and it is called a knowledge processing unit in a broad sense. The control information system 100' includes its inherent function of controlling process equipments and retrieving and modifying information (which are built-in functions not shown in FIG. 10) as well as an inquiry function unit 101 to the knowledge processing unit 200', a mathematical formula program execution management unit 102' and an interpreter 300', which are functions relating to the present invention.

The knowledge processing unit 200' comprises a man-machine processing unit 201', a mathematical formula selection unit 202' and a program generation unit 203'. The man-machine processing unit 201' supports the user in defining the mathematical formula models and their usage conditions. The mathematical formula defined here can be generally expressed as $$EQ_0: J = F_0(X_1, \ldots X_N, P_{01} \ldots P_{0k}) \rightarrow \text{minimum} \quad (20)$$

$$\left.\begin{array}{l} EQ_1: F_1 \ (X_1, \ldots X_N, P_{11}, \ldots P_{1L}) \leqq b_1 \\ \cdot \quad \cdot \quad \quad \quad \cdot \quad \quad \cdot \\ \cdot \quad \cdot \quad \quad \quad \cdot \quad \quad \cdot \\ \cdot \quad \cdot \quad \quad \quad \cdot \quad \quad \cdot \\ EQ_M: F_M \ (X_1, \ldots X_N, P_{M1} \ldots P_{MS}) \leqq b_M \end{array}\right\} \quad (21)$$

where $EQ_0, EQ_1, \ldots EQ_M$: name of mathematical formula model $$X_i E(x_1, x_2, \ldots x_p, y_1, y_2, \ldots y_q) \quad (22)$$

$x_j$: variable determined by the built-in function of the information control function, which is used to execute the mathematical formula program determined by the knowledge processing unit 200'

$P_{i,j}$: parameter $$y_k = f_k(x_1, x_2, \ldots x_N)(k = 1-q) \quad (23)$$

$F_0, \ldots F_M, f_1 \ldots f_k$: function $b_1, \ldots b_M$: variable or constant representing the upper limit.

The function $F_0, \ldots F_M, f_1 \ldots f_k$ is a model of the object or condition of the control information processing and defined by using a previously prepared operation. The usage condition of the mathematical formula model can be defined by the man-machine processing unit 201 in the form of "IF~THEN . . . ". If the condition "~" is met and the conclusion " . . . " includes the name of mathematical formula $EQ_i$ ($i = 1 \sim M$), it means that the mathematical form model $EQ_i$ should be used in the control information system. When the parameters and the upper limits $b_1, \ldots b_M$ in the formulas (20), (21) and (23) vary with the condition, they may be described in the form of rule "IF~THEN . . . " so that an optimum value thereof can be determined during the estimation by the mathematical formula selection unit 202. Those rules are stored in the file F5.

Each time the mathematical formula model is defined, the program generation unit 203 converts the mathematical model to a program (intermediate code) which is executable by the control unit 100' and stores it in the file $F_f$. The intermediate code has the operator prepared by the interpreter 300, the data representing the storage location of the data used by the operator and the data representing the storage location for the operation result as a set.

Figure 11A:
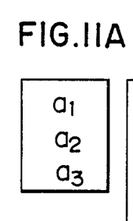
FIGS. 11A to 11C show more generalized embodiments of the present invention.
Figure 11B:
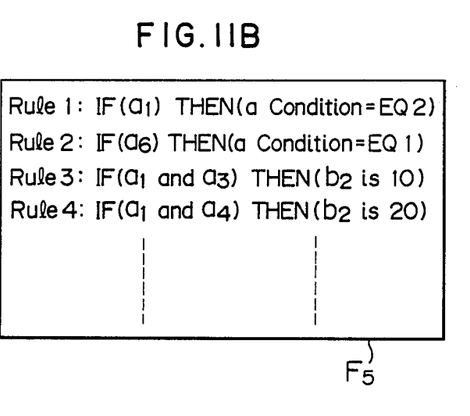
Figure 11C:
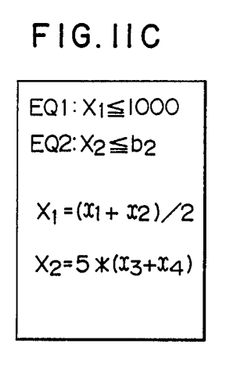

The inquiry step 101' of the control unit 100' corresponds to the steps 102-A and 102-B of FIG. 2. It inquires what mathematical formula model is to be used for control. The mathematical formula selection unit 202 transfers necessary data (status data and other data) from the file $F_1$. It selects the mathematical formula to be used by using the transferred data and the rule stored in the file $F_5$, and determines the upper and lower limits and the parameters. FIGS. 11A to 11C show the relationships thereof. FIG. 11A shows the data $a_1 \sim a_3$ inputted to the mathematical formula selection unit 202 and FIG. 11B shows the rule stored in the file $F_5$. $EQ_1$ and $EQ_2$ represent the mathematical formula models and FIG. 11C shows the definition formulas thereof, in which $b_2$ is the name of variable which represents the upper limit of $EQ_2$. From FIG. 11B, it is seen that the rules 1 and 3 are met. Accordingly, the mathematical model $EQ_2$ is selected and the upper limit is $b_2 = 10$.

The mathematical formula selection unit 202 returns that information to the inquiry unit 101' (storage locations for $EQ_2$ and $b_2$ (= 10)). The storage location for $b_2$ is the storage location which was assigned to $b_2$ when $EQ_2$ was converted to the intermediate code in the program generation unit 203. The same is true when a plurality of mathematical formula models are selected.

The inquiry unit 101' stores the upper limit and the parameters at the designated storage location. The execution program management unit selects the corresponding mathematical formula program from the mathematical formula programs inputted by the inquiry unit 101', from the file $F_f$ and causes the interpreter 300' to execute it. The interpreter 300' sends the operation result to the execution management unit 102'.

By determining the definition and condition of the mathematical formula model, the control function can be very readily expanded or modified.

We claim:

1. In a control system of a plant, a computer control system utilizing knowledge processing comprising:

first and second storage means for storing a plurality of mathematical models representing a control strategy and usage conditions for the mathematical models, respectively;

program generating means, responsive each time a mathematical model is stored in said first storage means, for generating an executable program of the mathematical model and for converting said executable program to an intermediate code program;

third storage means connected to said program generation means for storing intermediate code programs provided thereby;

comparing means for sequentially comparing status data and control specification data of a plant to be controlled as supplied from a control unit with the usage conditions of the mathematical models stored in said second storage means;

means responsive to said comparing means finding correspondence between said supplied status and specification data and a stored usage condition for selecting the mathematical model for that usage condition from said first storage means;

interpreter means responsive to selection of a mathematical model by said selecting means for executing the intermediate code program corresponding to the selected mathematical model to produce a calculated result; and means for controlling the plant in accordance with the calculated result given by said interpreter means.

2. A computer controlling system utilizing knowledge processing according to claim 1, wherein said plurality of mathematical models and said usage conditions therefor comprise cost functions and restriction conditions for the plant under control.

3. A computer control system utilizing knowledge base according to claim 1, wherein each mathematical model is related with a mathematical model name, and a usage condition for each mathematical model comprises a presumption portion representing a condition for the use of the mathematical model and a conclusion portion including the corresponding mathematical formula model name.

* * * * *